UNITED STATES PATENT OFFICE.

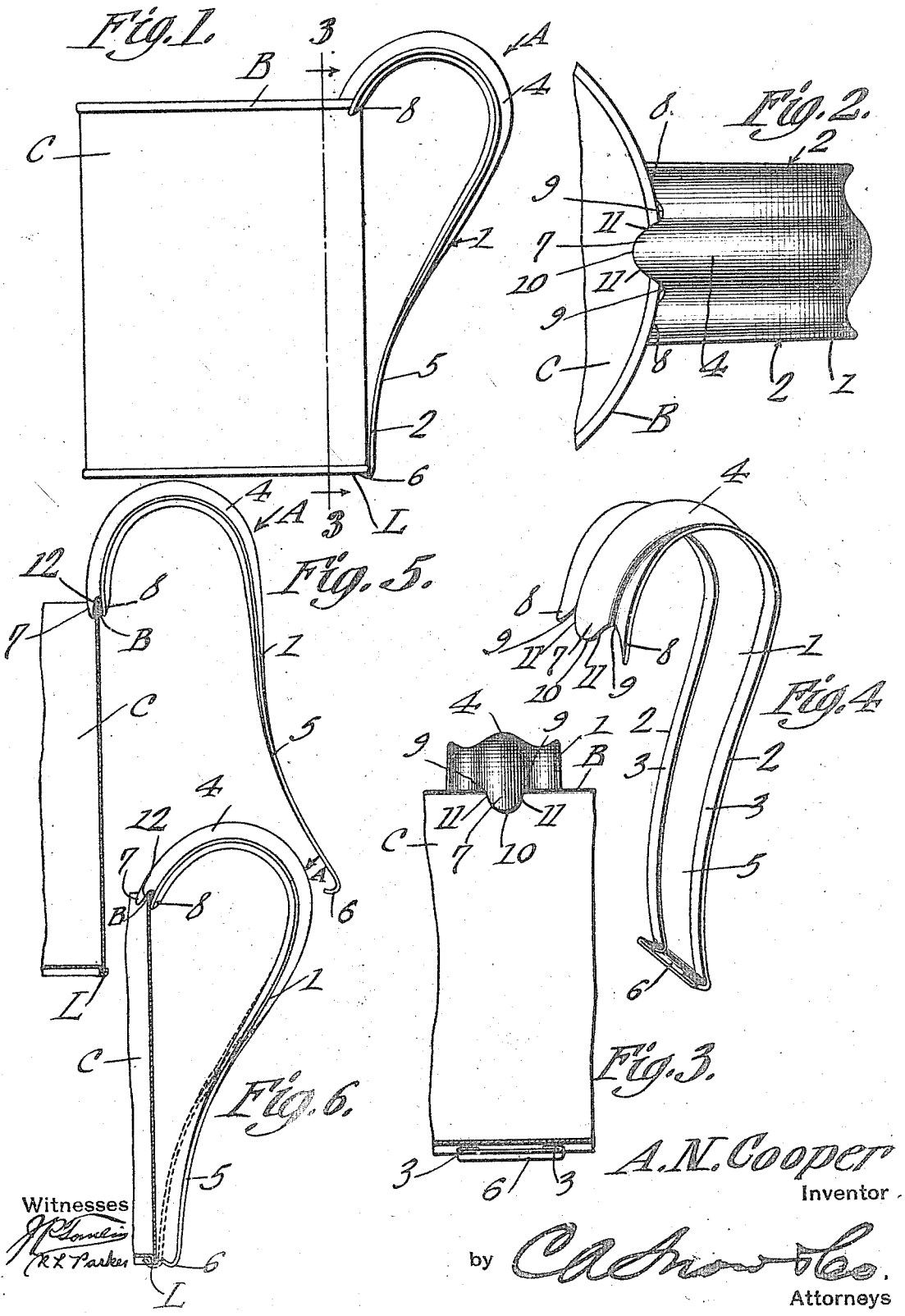

ALBERT N. COOPER, OF DAVIS, CALIFORNIA.

DETACHABLE HANDLE.

1,209,676.

Specification of Letters Patent.

Patented Dec. 26, 1916.

Application filed June 14, 1915. Serial No. 34,008.

*To all whom it may concern:*

Be it known that I, ALBERT N. COOPER, a citizen of the United States, residing at Davis, in the county of Yolo and State of California, have invented a new and useful Detachable Handle, of which the following is a specification.

This invention relates to detachable handles which may be readily attached to and detached from vessels of various types, such as drinking, cooking or measuring receptacles and discarded fruit or vegetable cans, which after cleaning, may be converted into a useful vessel by employing this device.

An object of the present invention, is to provide a detachable handle that may be attached to the proper receptacle with minimum effort, but which after attachment, will present the maximum rigidity.

A further object of the invention is to provide a detachable handle of general improved construction, whereby the device will be simple, durable and inexpensive in construction, as well as convenient, practical, serviceable and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiments in the accompanying drawings, wherein:

Figure 1 is a side elevation of a receptacle depicting the improved detachable handle applied thereto. Fig. 2 is a top plan of the detachable handle shown applied to a receptacle. Fig. 3 is a longitudinal vertical sectional view taken on the line 3—3 of Fig. 1. Fig. 4 is a perspective view of the improved detachable handle *per se*. Figs. 5 and 6 are diagrammatic views depicting the manner of attaching the improved handle.

Referring to the drawings, the character C indicates a cup to which the improved handle is attached. The handle is preferably formed from a single piece of metal 1 which has its longitudinal edges turned upon themselves, as indicated at 2, to provide reinforcing ribs or beads 3. A central arcuate rib or corrugation 4 is formed at the top or curved end of the handle 1 and extends longitudinally toward the opposed or lower end of said handle. This arcuate rib 4, however, is gradually diminished as it approaches the lower end of the handle until it blends into a flat or plane surface 5. The lower or flat end 5 of the handle is provided with a V-shaped hook 6 which extends transversely across the lower flat end 5 of the handle 1 and is adapted to engage the lower edge of the cup C.

In order that the handle 1 may be attached to the cup C with the minimum effort, but at the same time insuring the maximum of rigidity, there is provided an intermediate rigid prong or finger 7 and spaced resilient prongs or fingers 8 are disposed at each side of the rigid finger 7. The rigid finger 7 is formed at the upper or curved terminal of the arcuate rib 4 by providing V-shaped longitudinally disposed slots 9 at each side of the terminal of the arcuate rib 4 and then rounding it off as indicated at 10; while the resilient fingers 8 are formed at the upper curved terminal of the reinforcing ribs 3. They are also, intersected by the V-shaped slots 9 which impart to the said resilient fingers 8, a tapered or triangular shape. It will be observed that, since, the transverse plane of the handle and that the rigid finger 7 and resilient fingers 8 are intersected or cut by the same V-shaped slots 9, the angular edges 11 of the rigid finger 7 will lie in a transverse plane that is disposed at an angle to the transverse plane in which the resilient fingers 8 lie. In other words, in side view, an angle 12 is defined between the angular edges 11 of the rigid finger 7 and the outer face of the resilient fingers 8. The function of this arrangement will be disclosed hereinafter.

In practical use, the improved handle 1 is attached to the cup C by placing the rigid finger 7 and the resilient fingers 8 on opposed sides of the upper edge B of the cup 1, with the lower end 5 of the handle spaced or swung outwardly from the lower edge L of the cup C. In this position, the upper edge or bead B of the cup is freely received by the angle 12 defined between the adjacent edges of the rigid finger 7 and the resilient fingers 8. The handle may now be rigidly attached to the cup C by simply pressing inwardly and downwardly upon the lobe or upper curved part of the handle 1 as indicated by the arrow A, which, owing to the superior rigidity of the upper or curved part of the handle 1 over the lower or relatively flat part of the handle, will cause the lower part of the handle to flex sufficiently to allow the V-shaped hook 6 to snap under the lower edge L of the cup C. The initial movement of the lower end 5 of the handle 1 toward the lower edge L of the cup C, will cause the resilient fingers 8 to engage the outer side of the cup C, and further inward movement of the lower end 5 of the handle 1 will cause the resilient fingers to engage and flex against the side of the cup, so that when the lower end 5 of the handle 1 has been moved inwardly sufficiently to cause the hook 6 to snap under the edge L, then the resilient fingers 8 will press against the side of the cup with considerable force, thereby insuring positive rigidity between the cup C and handle 1.

Having thus described the invention, what is claimed as new is:

The combination with a receptacle, of a detachable handle formed of sheet metal and having a curved rigid upper portion and a resilient lower portion, the curved portion having a rib which is arcuate in cross section extending throughout the length of the curved portion and blend at its lower end onto the said resilient portion, the lateral edges of the handle being turned upon themselves to provide flat reinforcing ribs which extend along each side of the handle throughout its entire length, a rigid hook extending from the lower terminal of the resilient portion of the handle, said hook being reinforced by the flat reinforcing ribs and adapted to rigidly engage the lower edge of the receptacle, a rigid tapered securing finger projecting from the upper terminal of the arcuate rib, the said rigid finger being arcuate in cross section to conform to the cross section of the said arcuate rib, resilient fingers extending from the upper terminal of the curved portion of the handle and being reinforced by the upper terminals of the flat ribs, the said resilient fingers being adapted to engage and flex against the outer wall of the receptacle when the hook has been moved to engagement with the lower edge of the receptacle, thereby coöperating with the said rigid fingers to rigidly secure the handle to the receptacle.

In testimony that I claim the foregoing as my own, I have hereto affixed my signature in the presence of two witnesses.

ALBERT N. COOPER.

Witnesses:
C. E. SCHAFF,
J. H. ROGERS.